United States Patent
Al-Housami et al.

(10) Patent No.: US 7,242,953 B2
(45) Date of Patent: Jul. 10, 2007

(54) TRANSMITTING A CONTROL MESSAGE ON A FORWARD ACCESS CHANNEL (FACH) IN A NETWORK FOR MOBILE TELECOMMUNICATIONS

(75) Inventors: Housam Maher Al-Housami, Calne (GB); Seau Sian Lim, Swindon (GB); Mazlyn Mona Mustapha, Swindon (GB); Philip Charles Sapiano, Corsham (GB)

(73) Assignee: Lucent Technologies Inc., Murray Hill, NJ (US)

( * ) Notice: Subject to any disclaimer, the term of this patent is extended or adjusted under 35 U.S.C. 154(b) by 518 days.

(21) Appl. No.: 10/420,146

(22) Filed: Apr. 22, 2003

(65) Prior Publication Data
US 2004/0214590 A1   Oct. 28, 2004

(51) Int. Cl.
*H04B 7/00* (2006.01)

(52) U.S. Cl. .................. 455/522; 455/69; 455/515; 455/13.4; 370/252; 370/278; 370/328

(58) Field of Classification Search ................. 455/513, 455/69, 73, 78, 88, 551, 552.1, 561, 95, 115.3, 455/115.4, 127.1, 127.4, 127.5, 134, 161.3, 455/522, 13.4; 370/252, 278, 328, 329, 341; 375/219, 220, 221
See application file for complete search history.

(56) References Cited

U.S. PATENT DOCUMENTS

2003/0174662 A1 *   9/2003   Malkamaki .................. 370/310
2004/0102205 A1 *   5/2004   Zhang et al. ................ 455/522

* cited by examiner

*Primary Examiner*—Nay Maung
*Assistant Examiner*—Dominic E. Rego

(57) ABSTRACT

A method is provided of transmitting a control message on a Forward Access Channel (FACH) from a base station in a network for mobile telecommunications in response to a Random Access Channel (RACH) message received from a mobile user terminal. The RACH message indicates to the base station a value of a parameter dependent upon signal attenuation between base station and mobile user terminal. The control message is transmitted repeatedly, the number of times transmission of the FACH control message is repeated being selected dependent upon the value of the parameter.

9 Claims, 5 Drawing Sheets

TRANSMITTING A CONTROL MESSAGE ON A FORWARD ACCESS CHANNEL (FACH) IN A NETWORK FOR MOBILE TELECOMMUNICATIONS

FIELD OF THE INVENTION

The present invention relates to a method of transmitting a control message on a Forward Access Channel (FACH) in a network for mobile telecommunications. The present invention also relates to a method at a mobile user terminal, and to a base station.

DESCRIPTION OF THE RELATED ART

In known UMTS networks, one transport channel from a base station to a mobile user terminal is a Forward Access Channel (FACH). The FACH channel carries signalling messages (i.e. control messages) and some user data traffic from a base station to the mobile user terminal (often denoted User Equipment, UE, in UMTS terminology). The base station consists of a radio network controller (RNC) and base transceiver (i.e. transmitter-receiver) station (Node B in UMTS terminology).

Each FACH signalling message is divided into several transport blocks. These transport blocks are sent in either Unacknowledged Mode (UM) in which transport blocks are not acknowledged by the mobile user terminal when received, or in Acknowledged Mode (AM) in which transport blocks are acknowledged by the mobile user terminal when received. In AM, if a transport block is not received correctly, it is retransmitted by the RNC from the base transceiver station to the mobile user terminal. Retransmission, of course, increases the overall likelihood of a transport block being received correctly.

In either UM or AM, the probability that one FACH message is received correctly is the probability that all of its constituent transport blocks are each received correctly. Accordingly, FACH message error rate is much greater than the transport block error rate.

To improve the likelihood of the FACH message being received correctly, it is known to allow the RNC to repeat transmission of FACH messages from the base transceiver station several times in quick succession. If the message is not received correctly in the first transmission, then hopefully it will be in one of the subsequent repetitions. If the message is received successfully, the mobile user terminal simply ignores any further repetitions.

In known UMTS networks, the number of times a FACH message is repeatedly sent from the base station is set such that the likelihood of a message being received successfully meets a predetermined threshold. In particular, the number of repeats is chosen such that a mobile user terminal in the worst location (i.e. at the edge of cell) and suffering the worst channel conditions, will be able to receive the FACH message with an acceptable likelihood of success.

The FACH channel is carried by the so-called secondary common control physical channel (S-CCPCH). S-CCPCH is a channel which is not power controlled by feedback. S-CCPCH transmit power from the base station is set such that S-CCPCH channel can be received by a mobile user terminal at the edge of cell and suffering bad channel conditions with a certain level of quality.

SUMMARY OF THE INVENTION

Embodiments of the present invention are a method of transmitting a control message on a Forward Access Channel (FACH), a method at a mobile user terminal, and a base station.

An embodiment of the present invention is a method of transmitting a control message on a Forward Access Channel (FACH) from a base station in a network for mobile telecommunications in response to a Random Access Channel (RACH) message received from a mobile user terminal. The RACH message indicates to the base station a value of a parameter dependent upon signal attenuation between base station and mobile user terminal. The control message is transmitted repeatedly. The number of times transmission of the FACH control message is repeated is selected dependent upon the value of the parameter.

By selecting the number of FACH message repetitions appropriate for individual mobile user terminals in this way, the overall number of unnecessary FACH message transmissions is reduced.

In consequence of having fewer FACH message repetitions, the FACH channel is used more efficiently, and interference to other channels is reduced.

The parameter can be transmission timing interval (TTI) indicated in a Random Access Channel (RACH) message sent from the mobile user terminal in response to which the FACH control message is sent by the base station.

The parameter value can also be used to control the amount of base station transmit power for the FACH messages. The average transmit power required by the base station can thereby be reduced, which means more efficient use of the FACH channel, less interference to other channels, and more power resource is available for user traffic on other channels.

Other embodiments of the present invention provide a corresponding method at a mobile user terminal, and a corresponding base station.

DETAILED DESCRIPTION

Figure 1:
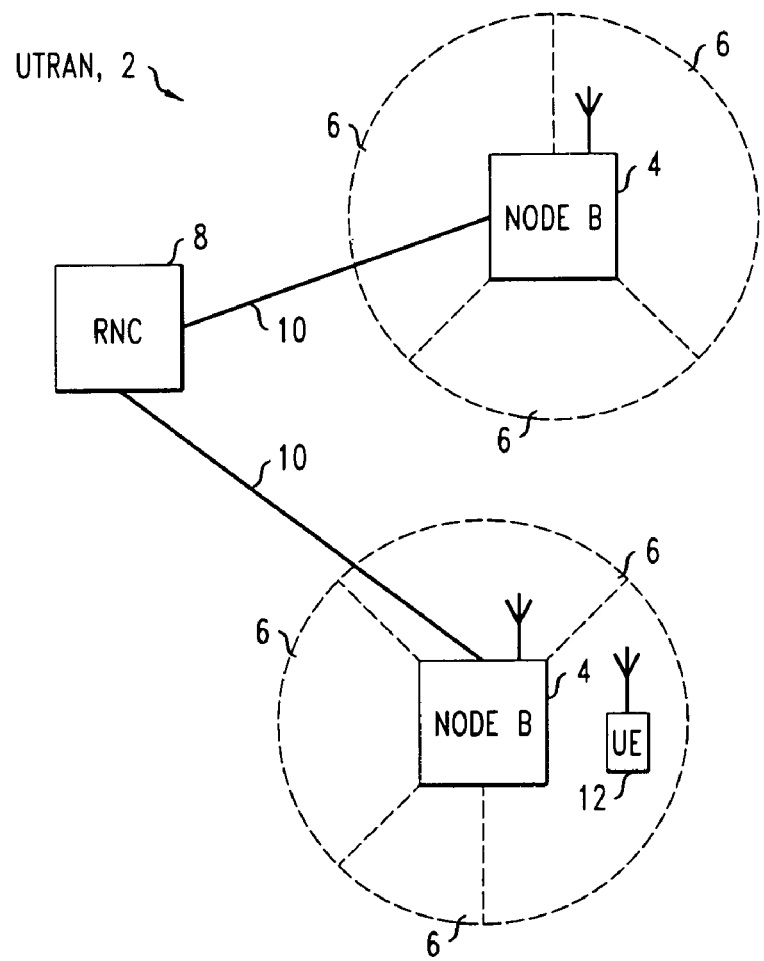
FIG. 1 is a diagram illustrating a preferred UMTS network

A Universal Mobile Telecommunications System (UMTS) terrestrial access network (UTRAN), which is a type of wideband code division multiple access (CDMA) network for mobile telecommunications, is basically as shown in FIG. 1. Only one radio network controller and two base stations of the UTRAN network 2 are shown for simplicity. As shown in this Figure, the UTRAN network 2 includes base transceiver stations 4. Each base transceiver station (Node B in UMTS terminology) 4 typically has three cells 6 (i.e. radio coverage areas, also known as sectors) as the base transceiver station 4 typically has three directional antennas (not shown) angled at 120 degrees to each other in azimuth. Radio network controllers (RNC) 8 which are themselves connected to the rest of the telecommunications "world" (not shown) each control several base stations 4 and hence a number of cells 6. A base transceiver station 4 is connected to its controlling radio network controller (RNC) 8 via a respective interface 10 known as an IuB interface. In use, a mobile user terminal 12 (often referred to as User Equipment (UE) in UMTS terminology) communicates with a serving radio network controller (RNC) 8 via at least one cell 6 of at least one base transceiver station 4 (i.e. communicates with the UTRAN network 2).

Figure 2:
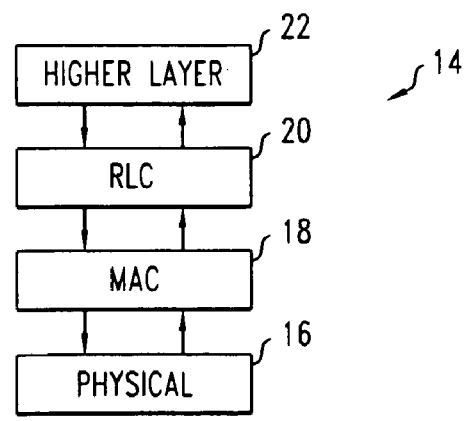
FIG. 2 is a diagram illustrating a hierarchical protocol stack used by the network.

Communications between the mobile user terminal 12 and RNC 8 are undertaken using a series 14 of hierarchically layered protocols (often referred to as a protocol stack), as shown in FIG. 2. The physical layer 16 communicates with the Medium Access Control (MAC) layer 18. The physical layer 16 offers various transport channels to the MAC layer 18. Different types of transport channels are defined by how and with what characteristics data is transferred on the physical layer 16. The MAC layer 18 offers various logical channels to the Radio Link Control (RLC) layer 20, where a logical channel is an information stream dedicated to a specific type of information characterizing the logical channel. The RLC layer 20 communicates with and is under the control of a higher layer 22.

FACH Channel

In the UMTS network, the Forward Access Channel (FACH) is a downlink transport channel, being downlink in the sense of being from base transceiver station 4 to mobile user terminal 12 rather than vice versa. As mentioned previously, the FACH channel carries signalling messages (i.e. control messages) and user data traffic from the RNC via a base transceiver station (Node B) to a mobile user terminal (UE).

Figure 3:
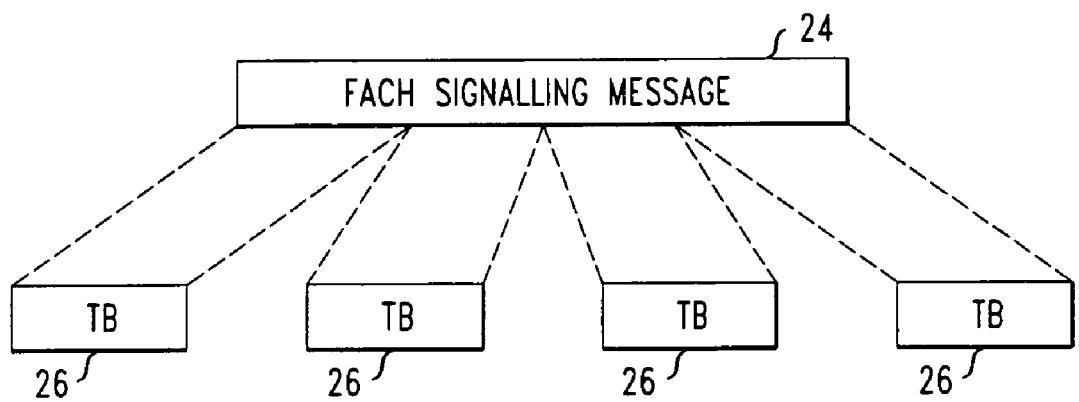
FIG. 3 is a diagram illustrating a FACH signalling message.

As shown in FIG. 3 each FACH signalling message 24 is divided into several transport blocks (TB, 26). These transport blocks are sent in the Radio Link Control (RLC) layer 20 in either Unacknowledged mode (UM) in which transport blocks are not acknowledged when received, or in Acknowledged Mode (AM) in which transport blocks are acknowledged when received.

When UM is used, the RNC does not know if the transport blocks were received correctly by the mobile user terminal. Therefore, some other mechanism, such as cyclic redundancy check, is used to increase the likelihood that the transport blocks are correctly received by the mobile user terminal. When AM is used, if a transport block is not received correctly, the transport block is retransmitted from the RNC (via the base transceiver station) to the mobile user terminal. This, of course, increases the overall chance of the transport block being received correctly.

Figure 4:
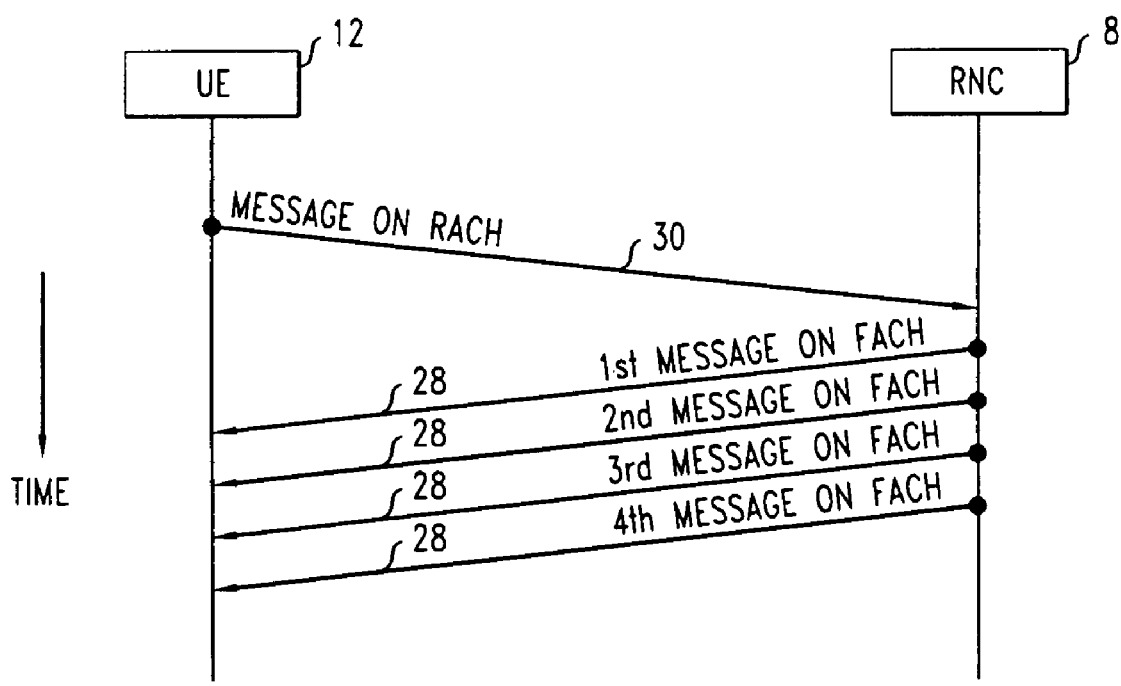
FIG. 4 is a diagram illustrating a message sequences on the RACH and FACH channels between a mobile user terminal (UE) and base station including radio network controller (RNC)

Some FACH signalling messages are sent in UM, which means that the RNC is not informed that the message was received correctly by the mobile user terminal. At the edge of a cell, the probability can be quite small that all the constituent transport blocks of one FACH message are received correctly and hence the FACH message is received correctly. As shown in FIG. 4, to improve the probability of message reception, the RNC 8 repeats transmission of FACH messages 28 several times in quick succession. The number of times the message is sent is determined by the higher layer 22. If the message is not received correctly in the first transmission, then hopefully it will be in one of the subsequent repetitions. If the message is received successfully, then the mobile user terminal ignores any subsequent repetitions.

Selection of Number of FACH Repeats

The number of times a FACH message is repeated is dynamically changed (i.e. adjusted periodically) to suit the attenuation of signals between base transceiver station and mobile user terminal. That attenuation depends on the distance of the mobile user terminal from the base transceiver station and the pathloss (attenuation per unit distance) experienced by the mobile user terminal. For example, FACH messages to a mobile user terminal at the edge of cell and experiencing greater pathloss are repeated more times than FACH messages to a mobile user terminal closer to the base station and experiencing less pathloss, the number of repetitions being selected by a mechanism explained below.

FACH signalling messages are usually sent in response to a Random Access Channel (RACH) signalling message (reference numeral 30 as shown in FIG. 4) sent in the uplink direction, i.e. from mobile user terminal to base station. Furthermore, user data sent on the FACH channel will also, in general, be a response to user data sent on the RACH channel.

Mobile user terminals transmit RACH messages using either a 10 ms or 20 ms transmission timing interval (TTI), when both are available. The TTI is the time period selected for transmitting a set of transport blocks.

Figure 5:
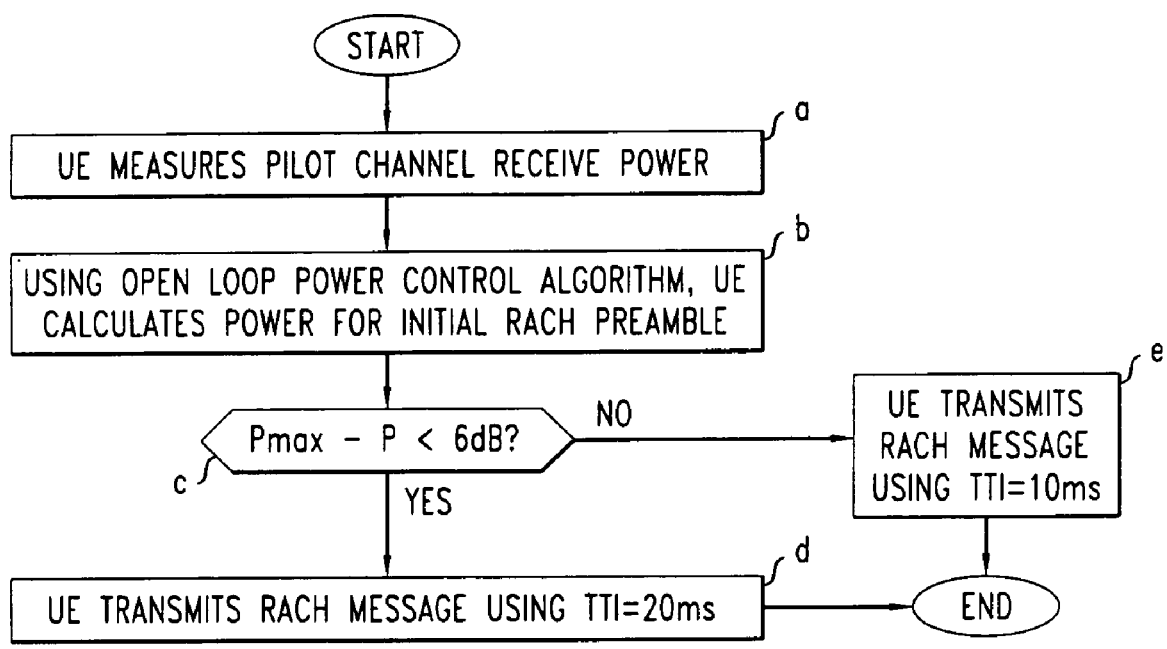
FIG. 5 is a flow chart illustrating selection of a TTI value by a mobile user terminal.

As shown in FIG. 5, to decide which TTI to use, the mobile user terminal first measures (step a as shown in the Figure) received power on a pilot channel. Then, using this course power control feedback (known as open loop power control), the mobile user terminal calculates (step b) the power level (P) it should use to transmit the initial RACH preamble. The maximum allowable transmit power for the mobile user terminal and power level (P) are then compared (step c). If the difference between the maximum allowable transmit power (Pmax) for the mobile user terminal and power level (P) is less than 6 dB(step c), the mobile user terminal uses a TTI of 20 ms (step d) . Otherwise, the mobile user terminal uses a TTI of 10 ms. This rule is specified in Third Generation Partnership Project (3GPP) Technical Specification 25.331. It will thus be seen that if the attenuation of signals from the base transceiver station to the mobile user terminal is less than a limit, then the mobile user terminal will use a TTI of 10 ms on the RACH channel. If the attenuation of signals is greater, the TTI of 20 mS is selected instead.

Figure 6:
FIG. 6 is a diagram illustrating a RACH message.

As shown in FIG. 6, data packets sent to the base transceiver station on the RACH channel each include a field known as the Transport Format Combination Indicator (TFCI) field in their headers. The TFCI field gives an indication to the base station of what TTI size is being used. For example, a TFCI value of 500 indicates a parameter set known to the base station that includes a value for TTI of 10 milliseconds. The base station, specifically the RNC, keeps a record (i.e. a look-up table) of various sets of values of parameters, each set being indicated by a particular TFCI value.

Figure 7:
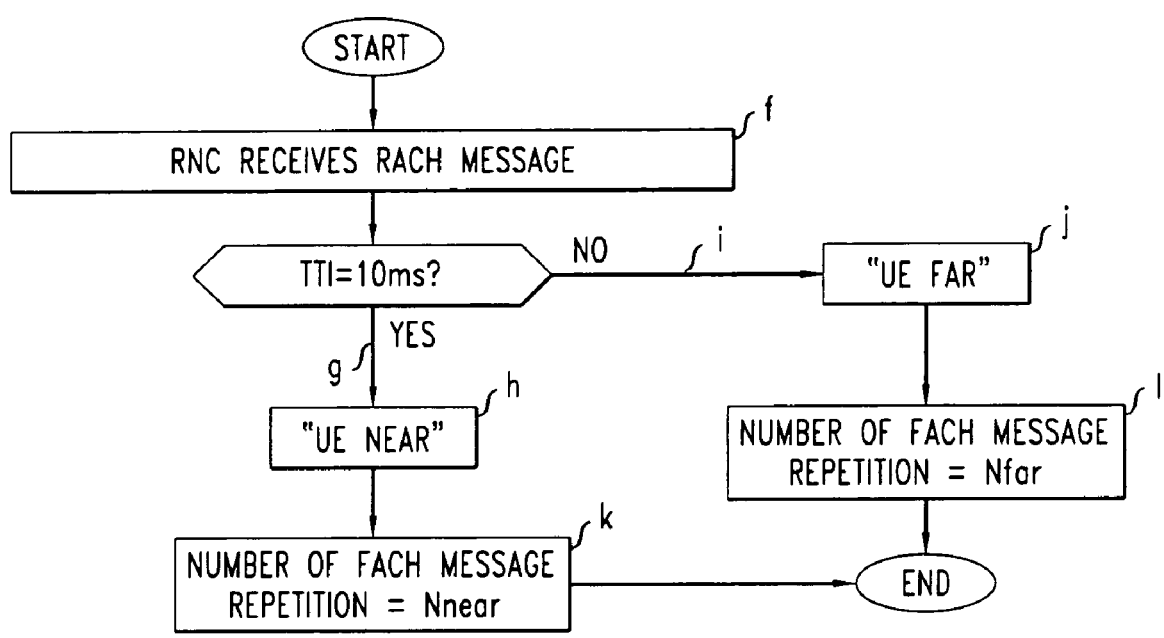
FIG. 7 is a flow chart illustrating selection of the number of times a FACH message is sent repeatedly from the base station including RNC in response to the TTI value.

TTI size indicated in the last RACH transmission received by the base station is used as a simple but effective indicator of signal attenuation between base station and mobile user terminal. The indicator is of two possible states which we denote as "UE near" and "UE far". More specifically, as shown in FIG. 7 if the latest RACH reception received (step f) by the base transceiver station and so RNC had a TTI of 10 ms (g), then the "UE near" state (h) is assumed. If on the other hand the latest RACH reception had a TTI of not 10 mS (i.e.20 ms) (i), then the "UE far" state (j) is assumed.

As shown in FIG. 7, the number of repetitions of FACH messages depends on whether the mobile user terminal is assessed to be in a "UE near" state, in which case the number of repetitions is set (k) to be Nnear. On the other hand, if the mobile user terminal is in the "UE far" state, the number of repetitions set (l) to be Nfar. Of course, Nnear is less than Nfar. For example, with TTI of 10 mS, there would be, say the initial transmission plus two repeats, whilst with a TTI of 20 mS there would be the initial transmission plus, say, four repeats.

Selection of Transmission Power

Figure 8:
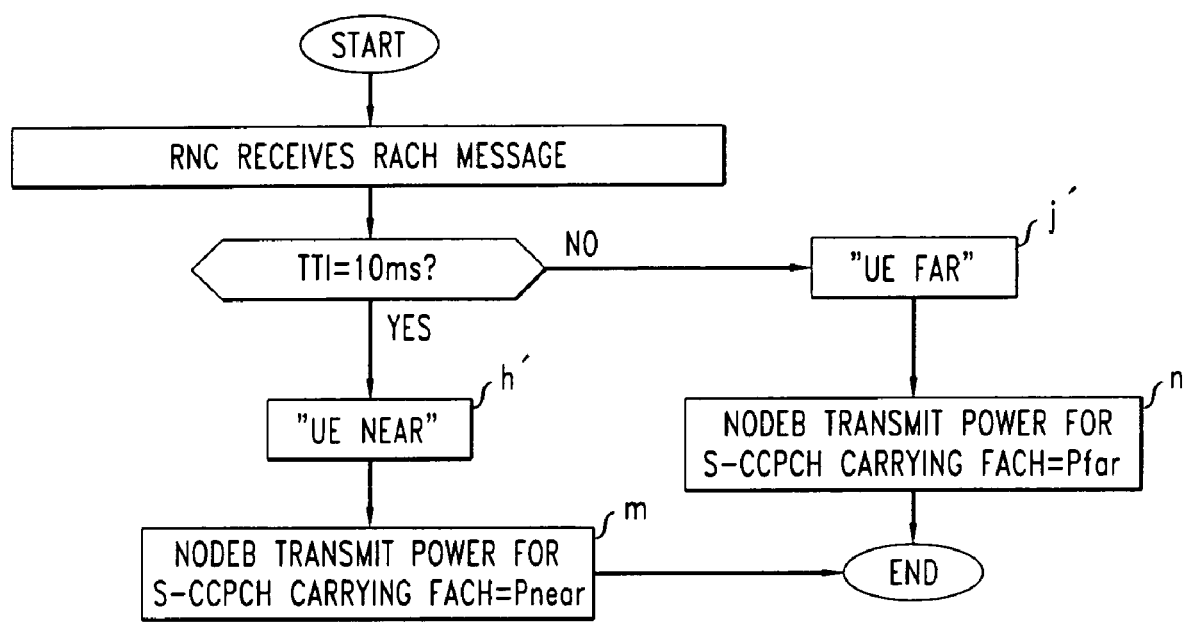
FIG. 8 is a flow chart illustrating selection in response to the TTI value of the transmit power at which the base station including RNC sends the FACH message.

In the exemplary embodiment, the same determination of whether a mobile user terminal is considered to be "UE near" or "UE far" is used to select the base transceiver station transmit power for the so-called secondary common control physical channel (S-CCPCH). S-CCPCH is the channel of the physical layer 16 that carries the both FACH signalling messages and FACH user traffic. As shown in FIG. 8, when the mobile user terminal is determined to be "UE near" (h'), the transmit power is selected as Pnear (step m). Similarly, Pfar is the transmit power selected (step n) for a mobile user terminal in state "UE far" (j'). Pnear is set to be less than Pfar.

For example, with TTI of 10 mS, there could be the initial transmission plus two repeats at a first power level, whereas with a TTI of 20 mS there could be the initial transmission plus four repeats at a higher power level, such as 6 dB higher.

The TTI value is used to control transmit power and number of repeat transmissions not only of control message traffic on the FACH channel but also user data traffic on the FACH channel. The transmit power setting is conveyed to the base transceiver station (Node B) from the RNC via a FACH data frame, as defined in Third Generation Partnership Project (3GPP) Technical Specification 25.435.

Some Unacknowledged Mode (UM) messages that are sent on the FACH channel require a response from the mobile user terminal. For these messages that require such a response, a failure in receiving a response from the mobile user terminal despite a number of repeats selected dependent on the TTI value necessarily results in further message retransmission with increased transmit power on the FACH channel so as to further enhance the likelihood of correct reception.

In some embodiments, if there is more than one FACH channel per SCCPCH channel, and more than one FACH transport block to be transmitted to a mobile user terminal at a time, then the higher FACH transmit power is used for all the FACH transport blocks regardless of whether the mobile user terminal is considered to be near or far as indicated by the TTI value. This is so as to reduce the actual number of repetitions selected dependent on whether the mobile user terminal is considered to be near or far.

In some embodiments, the RNC may schedule FACH transport blocks for transmission or retransmission at times based on their power requirements so that transport blocks that need to be transmitted at the same transmit power are sent together.

Some other embodiments relate to other types of code division multiple access (CDMA) or wideband code division multiple access (W-CDMA) networks for mobile telecommunications.

The invention claimed is:

1. A method of transmitting a control message on a downlink channel from a base station in a network for mobile telecommunications in response to a message received from a mobile user terminal, the received message indicating a value of a parameter dependent upon signal attenuation between the base station and the mobile user terminal, the method comprising:
   selecting a number of times to repeatedly transmit the control message downlink dependent upon the value of the parameter,
   repeatedly transmitting the control message downlink the selected number of times,
   wherein the parameter is transmission timing interval (TTI), the value of the TTI parameter being selected dependent upon the power received at the mobile user terminal for a transmit signal sent with predetermined power,
   wherein transmit power for the downlink control message is selected dependent upon the value of the parameter.

2. The method according to claim 1, wherein if the value of the TTI parameter is a first value, a first number of times of transmitting the message is selected, and wherein if the value of the TTI parameter is a second value greater than the first value, a second number of times of transmitting the message is selected, the second number of times being greater than the first number of times.

3. The method according to claim 1, wherein the parameter is transmission timing interval (TTI), the value of the TTI parameter being selected dependent upon the received power at the mobile user terminal for a transmit signal sent with predetermined power, wherein the TTI is selected as a first value or a second value greater than the first value, and wherein if the TTI is the first value a first transmit power is selected, and wherein if the TTI is the second value a second transmit power is selected, the second transmit power being greater than the first transmit power.

4. The method according to claim 3 wherein the first value is 10 milliseconds and the second value is 20 milliseconds.

5. The method according to claim 1, wherein the network is at least substantially operative in accordance with Universal Mobile Telecommunications System standards, and the base station comprises a radio network controller and base transceiver station.

6. A base station for mobile telecommunications comprising:
   means for receiving a message indicating a value of a parameter dependent upon signal attenuation to the base station;
   means for selecting a number of times a control message is to be repeatedly transmitted downlink dependent upon the value of the parameter indicated on the received message; and
   means for repeatedly transmitting the control message downlink the selected number of times,
   wherein the parameter is transmission timing interval (TTI), the value of the TTI parameter being selected dependent upon the power received at the mobile user terminal for a transmit signal sent with predetermined power,
   wherein the control message is transmitted downlink at a transmit power dependent upon the value of said parameter.

7. The base station according to claim 6, wherein the parameter is transmission timing interval (TTI) taking a first value of or a second value greater than the first value, the selecting means selecting a first number of times if the TTI takes the first value, and selecting a second number of times if the TTI takes the second value, the second number of times being greater than the first number of times.

8. The base station according to claim 6, wherein the parameter is transmission timing interval (TTI) taking a first value or a second value greater than the first value, the control message being transmitted at a first transmit power if the TTI takes the first value, and is transmitted at a second transmit power if the TTI takes the second value, the second transmit power being greater than the first transmit power.

9. The base station according to claim 6, wherein it is at least substantially operative in accordance with Universal Mobile Telecommunications System standards, and further comprises a radio network controller and base transceiver station.

* * * * *